United States Patent
Carpenter et al.

(10) Patent No.: US 10,162,531 B2
(45) Date of Patent: Dec. 25, 2018

(54) PHYSICAL ALLOCATION UNIT OPTIMIZATION

(71) Applicant: International Business Machines Corporation, Armonk, NY (US)

(72) Inventors: Preston A. Carpenter, Vail, AZ (US); Gregory E. McBride, Vail, AZ (US); David C. Reed, Tucson, AZ (US); Esteban Rios, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 65 days.

(21) Appl. No.: 15/411,985

(22) Filed: Jan. 21, 2017

(65) Prior Publication Data

US 2018/0210647 A1    Jul. 26, 2018

(51) Int. Cl.
*G06F 3/06* (2006.01)
*G06F 12/02* (2006.01)

(52) U.S. Cl.
CPC .............. *G06F 3/061* (2013.01); *G06F 3/067* (2013.01); *G06F 3/0608* (2013.01); *G06F 3/0631* (2013.01); *G06F 3/0689* (2013.01); *G06F 12/023* (2013.01)

(58) Field of Classification Search
CPC ...... G06F 3/0608; G06F 3/061; G06F 3/0631; G06F 3/0644; G06F 3/0683; G06F 3/0689; G06F 12/023; G06F 12/0223
See application file for complete search history.

(56) References Cited

U.S. PATENT DOCUMENTS

| | | |
|---|---|---|
| 6,088,777 A | 7/2000 | Sorber |
| 6,763,428 B1 | 7/2004 | Cappon |
| 7,783,852 B2 | 8/2010 | Lahiri et al. |
| 8,127,076 B2 | 2/2012 | Galloway et al. |
| 8,180,991 B2 | 5/2012 | Ravindranath et al. |

(Continued)

FOREIGN PATENT DOCUMENTS

WO    WO2005081113 A2    9/2005

OTHER PUBLICATIONS

Masmano, M., et al., "TLSF: a New Dynamic Memory Allocator for Real-Time Systems", IEEE, Proceedings of the 12th 16th Euromicro Conference on Real-Time Systems, Jun. 2004.

(Continued)

*Primary Examiner* — Hal Schnee
(74) *Attorney, Agent, or Firm* — Nelson and Nelson; Daniel P. Nelson; Alexis V. Nelson

(57) ABSTRACT

A method for optimizing the allocation of extents to data sets is disclosed. In one embodiment, such a method includes providing multiple storage classes. These storage classes may include a first storage class configured to allocate larger extents to data sets, a second storage class configured to allocate smaller extents to data sets, and a mixed-mode storage class configured to allocate a combination of the smaller and larger extents to data sets. The method further enables data sets to be assigned to one of the multiple storage classes. Upon assigning a data set to the mixed-mode storage class, the method causes an initial portion of the data set to be allocated the larger extents, and an ending portion of the data set to be allocated the smaller extents. A corresponding system and computer program product are also disclosed.

20 Claims, 8 Drawing Sheets

(56) References Cited

U.S. PATENT DOCUMENTS

| | | | |
|---|---|---|---|
| 8,799,267 B2 | 8/2014 | Milby et al. | |
| 8,843,459 B1* | 9/2014 | Aston | G06F 17/30067 |
| | | | 707/694 |
| 8,935,455 B2 | 1/2015 | Bohling et al. | |
| 9,323,655 B1* | 4/2016 | Sahin | G06F 12/023 |
| 9,323,682 B1* | 4/2016 | Marshak | G06F 12/0868 |
| 9,965,381 B1* | 5/2018 | Sahin | G06F 12/023 |
| 2011/0010514 A1* | 1/2011 | Benhase | G06F 3/061 |
| | | | 711/162 |
| 2013/0117515 A1* | 5/2013 | Ashmore | G06F 12/16 |
| | | | 711/162 |
| 2013/0205088 A1* | 8/2013 | Benhase | G06F 12/0811 |
| | | | 711/122 |
| 2013/0219139 A1* | 8/2013 | Wang | G06F 3/061 |
| | | | 711/162 |
| 2015/0058554 A1* | 2/2015 | Gupta | G06F 3/0619 |
| | | | 711/114 |
| 2017/0308303 A1* | 10/2017 | Sterns | G06F 3/064 |

OTHER PUBLICATIONS

Barrett, Kenneth, et al., "Staging for z/OS Optimization", Chapter 7, Running Mainframe z on Distributed Platforms, www.springer.com, pp. 109-126, Apr. 14, 2014.

* cited by examiner

PHYSICAL ALLOCATION UNIT OPTIMIZATION

BACKGROUND

Field of the Invention

This invention relates to systems and methods for optimizing the allocation of extents to data sets.

Background of the Invention

The IBM DS8000™ enterprise storage system uses a virtualization layer to abstract the creation of volumes from underlying storage. This virtualization layer creates uniformly sized chunks of data called extents on RAID arrays and then creates storage pools of these extents which can be used to create volumes. Storage pool striping, tiered storage data placement, and thin provisioning may exploit these extents in order to provide their functions. The extent size has conventionally been fixed at 1113 cylinders (or 1 GB) for Count Key Data (CKD) volumes. However, newer firmware releases for the IBM DS8000™ provide capability to optionally define a storage pool using smaller extents which are 21 cylinders, or 16 MB, in size.

The ability to use smaller extents when forming data sets may provide various benefits. For example, the use of smaller extents may enable data to be striped across a RAID array at a much more granular level, thereby improving workload distribution even over very short periods of time. Tiered storage products such as Easy Tier may also see efficiency improvements, especially in thin-provisioned environments. Use of the smaller extents may also substantially improve the efficiency of thin provisioning since the allocation unit for thin provisioning may be substantially smaller.

Nevertheless, use of the smaller extent size may not be beneficial or provide performance improvements in all cases and with all data sets. In some cases and with certain data sets, use of the larger extent size may provide higher performance and/or efficiency. In other cases, using a combination of smaller and larger extents may provide the greatest efficiency and performance with certain types of data sets.

In view of the foregoing, what are needed are systems and methods to optimize the allocation of extents to data sets. Such systems and methods will ideally select appropriately size extents based on which extents would provide the greatest efficiency and/or performance. Further needed are systems and methods to use a combination of smaller and larger extents with certain data sets where it would improve efficiency and/or performance.

SUMMARY

The invention has been developed in response to the present state of the art and, in particular, in response to the problems and needs in the art that have not yet been fully solved by currently available systems and methods. Accordingly, systems and methods are disclosed to optimize the allocation of extents to data sets. The features and advantages of the invention will become more fully apparent from the following description and appended claims, or may be learned by practice of the invention as set forth hereinafter.

Consistent with the foregoing, a method for optimizing the allocation of extents to data sets is disclosed. In one embodiment, such a method includes providing multiple storage classes. These storage classes may include a first storage class configured to allocate larger extents to data sets, a second storage class configured to allocate smaller extents to data sets, and a mixed-mode storage class configured to allocate a combination of the smaller and larger extents to data sets. The method further enables data sets to be assigned to one of the multiple storage classes. Upon assigning a data set to the mixed-mode storage class, the method causes an initial portion of the data set to be allocated the larger extents, and an ending portion of the data set to be allocated the smaller extents.

A corresponding system and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
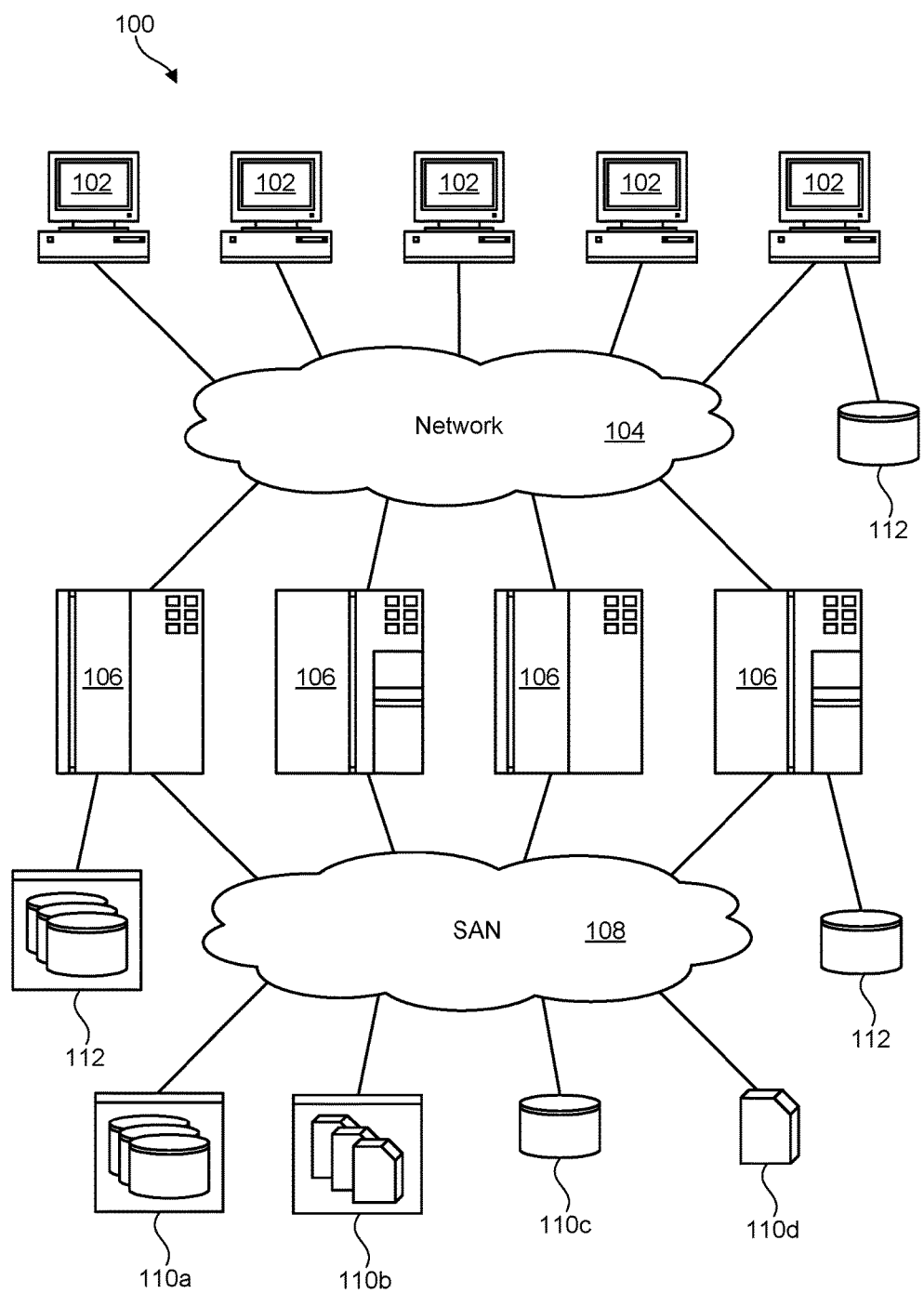
FIG. 1 is a high-level block diagram showing one example of a network environment in which a system and method in accordance with the invention may be implemented.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The present invention may be embodied as a system, method, and/or computer program product. The computer program product may include a computer readable storage medium (or media) having computer readable program instructions thereon for causing a processor to carry out aspects of the present invention.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on a user's computer, partly on a user's computer, as a stand-alone software package, partly on a user's computer and partly on a remote computer, or entirely on a remote computer or server. In the latter scenario, a remote computer may be connected to a user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Referring to FIG. 1, one example of a network environment 100 is illustrated. The network environment 100 is presented to show one example of an environment where systems and methods in accordance with the invention may be implemented. The network environment 100 is presented by way of example and not limitation. Indeed, the systems and methods disclosed herein may be applicable to a wide variety of network environments, in addition to the network environment 100 shown.

As shown, the network environment 100 includes one or more computers 102, 106 interconnected by a network 104. The network 104 may include, for example, a local-area-network (LAN) 104, a wide-area-network (WAN) 104, the Internet 104, an intranet 104, or the like. In certain embodiments, the computers 102, 106 may include both client computers 102 and server computers 106 (also referred to herein as "host systems" 106). In general, the client computers 102 initiate communication sessions, whereas the server computers 106 wait for requests from the client computers 102. In certain embodiments, the computers 102 and/or servers 106 may connect to one or more internal or external direct-attached storage systems 112 (e.g., arrays of hard-disk drives, solid-state drives, tape drives, etc.). These computers 102, 106 and direct-attached storage systems 112 may communicate using protocols such as ATA, SATA, SCSI, SAS, Fibre Channel, or the like. One or more of the storage systems 112 may utilize the apparatus and methods disclosed herein.

The network environment 100 may, in certain embodiments, include a storage network 108 behind the servers 106, such as a storage-area-network (SAN) 108 or a LAN 108 (e.g., when using network-attached storage). This network 108 may connect the servers 106 to one or more storage systems 110, such as arrays 110a of hard-disk drives or solid-state drives, tape libraries 110b, individual hard-disk drives 110c or solid-state drives 110c, tape drives 110d, CD-ROM libraries, or the like. To access a storage system 110, a host system 106 may communicate over physical connections from one or more ports on the host 106 to one or more ports on the storage system 110. A connection may be through a switch, fabric, direct connection, or the like. In certain embodiments, the servers 106 and storage systems 110 may communicate using a networking standard such as Fibre Channel (FC). One or more of the storage systems 110 may utilize the systems and methods disclosed herein.

Figure 2:
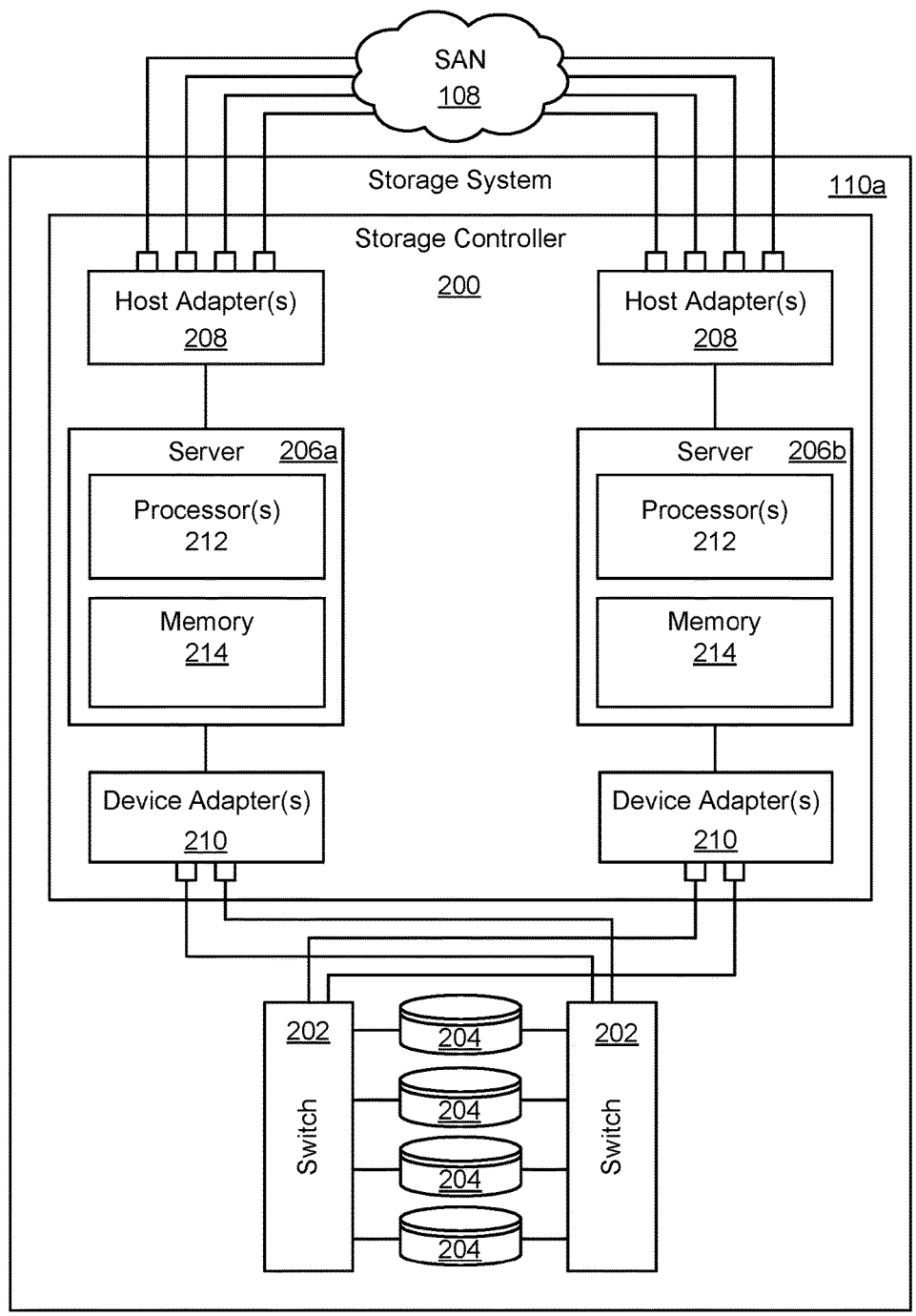
FIG. 2 is a high-level block diagram showing an example of a storage system containing an array of storage drives.

Referring to FIG. 2, one embodiment of a storage system 110a containing an array of hard-disk drives 204 and/or solid-state drives 204 is illustrated. The internal components of the storage system 110a are shown since functionality in accordance with the invention may be implemented within such a storage system 110a. As shown, the storage system 110a includes a storage controller 200, one or more switches 202, and one or more storage devices 204, such as hard disk drives 204 or solid-state drives 204 (such as flash-memory-based drives 204). The storage controller 200 may enable one or more hosts 106 (e.g., open system and/or mainframe servers 106) to access data in the one or more storage devices 204.

In selected embodiments, the storage controller 200 includes one or more servers 206. The storage controller 200 may also include host adapters 208 and device adapters 210 to connect the storage controller 200 to host devices 106 and storage devices 204, respectively. Multiple servers 206a, 206b may provide redundancy to ensure that data is always available to connected hosts 106. Thus, when one server 206a fails, the other server 206b may pick up the I/O load of the failed server 206a to ensure that I/O is able to continue between the hosts 106 and the storage devices 204. This process may be referred to as a "failover."

In selected embodiments, each server 206 may include one or more processors 212 and memory 214. The memory 214 may include volatile memory (e.g., RAM) as well as non-volatile memory (e.g., ROM, EPROM, EEPROM, hard disks, flash memory, etc.). The volatile and non-volatile memory may, in certain embodiments, store software modules that run on the processor(s) 212 and are used to access data in the storage devices 204. The servers 206 may host at least one instance of these software modules. These software modules may manage all read and write requests to logical volumes in the storage devices 204.

One example of a storage system 110a having an architecture similar to that illustrated in FIG. 2 is the IBM DS8000™ enterprise storage system. The DS8000™ is a high-performance, high-capacity storage controller providing disk storage that is designed to support continuous operations. Nevertheless, the systems and methods disclosed herein are not limited to the IBM DS8000™ enterprise storage system 110a, but may be implemented in any comparable or analogous storage system 110, regardless of the manufacturer, product name, or components or component names associated with the system 110. Furthermore, any storage system that could benefit from one or more embodiments of the invention is deemed to fall within the scope of the invention. Thus, the IBM DS8000™ is presented only by way of example and is not intended to be limiting.

Figure 3:
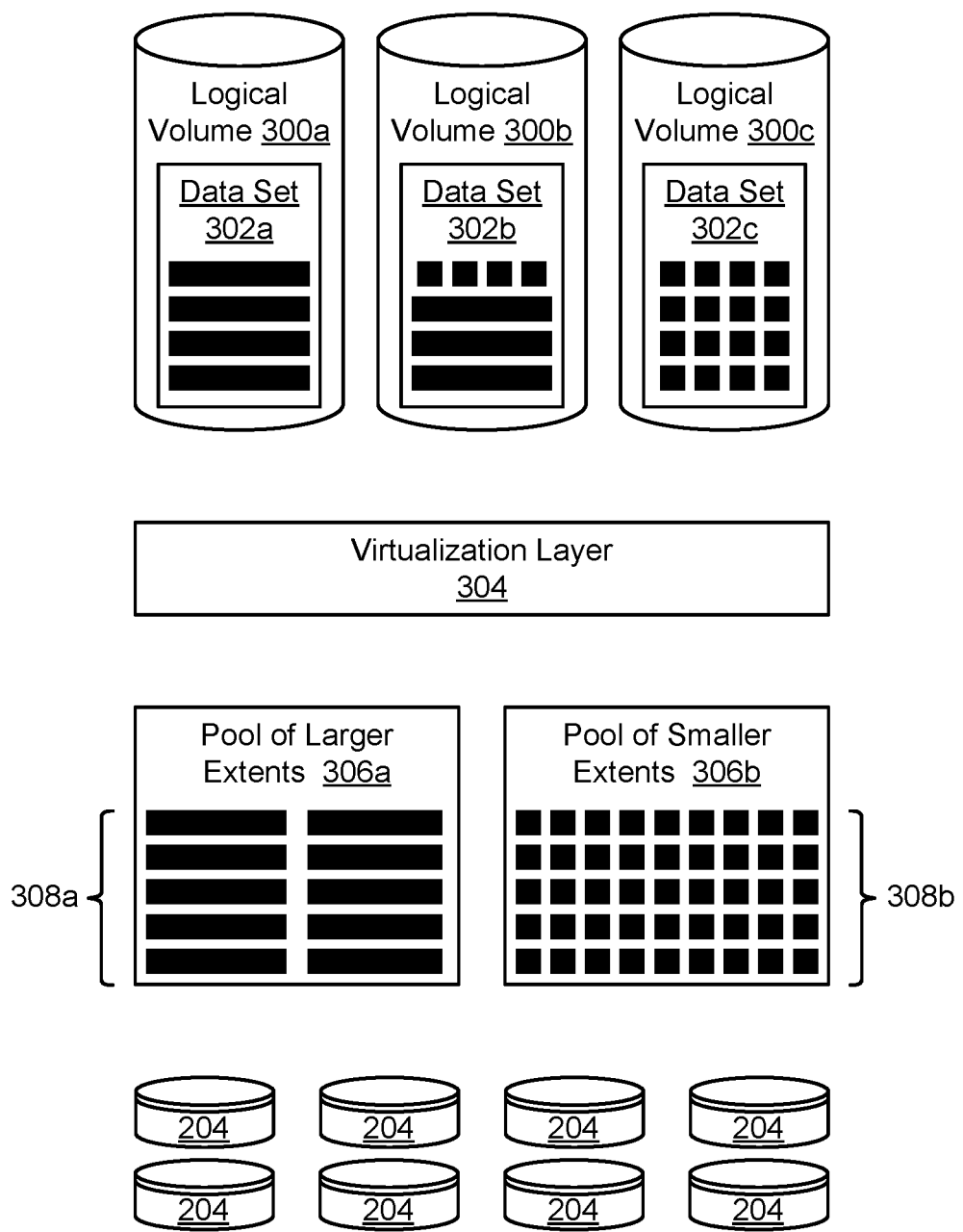
FIG. 3 is a high-level block diagram showing how underlying storage drives may be divided up into larger and smaller extents, and how these larger and smaller extents may be allocated to data sets within logical volumes.

Referring to FIG. 3, as previously mentioned, the IBM DS8000™ enterprise storage system uses a virtualization layer 304 to abstract the creation of volumes 300 from underlying storage 204. This virtualization layer 304 creates uniformly sized chunks of data called extents 308 on RAID arrays and then creates storage pools 306 of these extents 308 which can be used to create volumes 300. Storage pool striping, tiered storage data placement, and thin provisioning may exploit these extents 308 in order to provide their functions. The extent size has conventionally been fixed at 1113 cylinders (or 1 GB) for Count Key Data (CKD) volumes 300. FIG. 3 shows a storage pool 306a of larger extents 308a having this conventional size. However, newer firmware releases for the IBM DS8000™ provide capability to also define a storage pool 306b using smaller extents 308b which are 21 cylinders, or 16 MB, in size.

The ability to use smaller extents 308b with data sets 302c may provide various benefits. For example, the use of smaller extents 308b may enable data to be striped across a RAID array at a much more granular level, thereby improving workload distribution even over very short periods of time. Tiered storage products such as Easy Tier may also see efficiency improvements, especially in thin-provisioned environments. Use of the smaller extents 308b may also substantially improve the efficiency of thin provisioning since the allocation unit for thin provisioning may be substantially smaller.

Nevertheless, use of the smaller extent size may not be beneficial or provide performance improvements in all cases and with all data sets 302. In some cases with certain data sets 302a, use of the larger extent size may provide higher performance and/or efficiency. In other cases, using a combination of smaller and larger extents 308a, 308b may provide the greatest efficiency and performance with certain types of data sets 302b.

Figure 4:
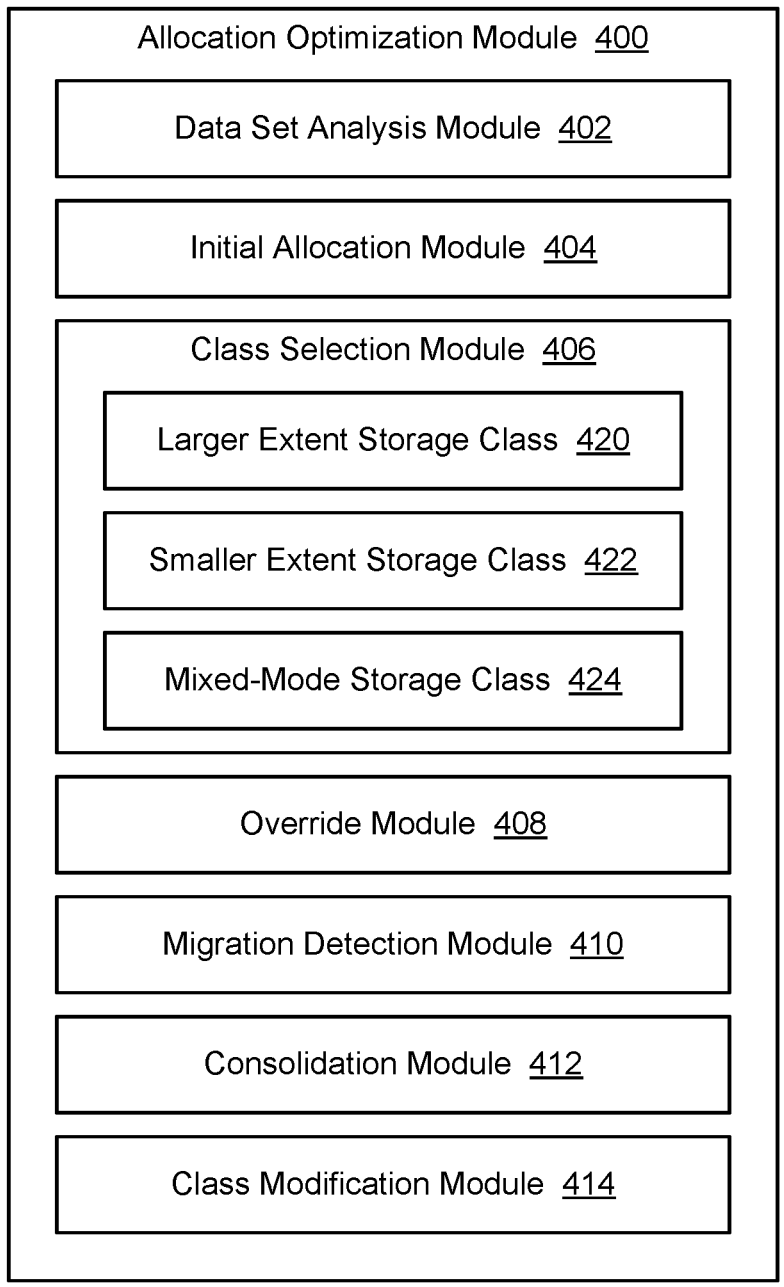
FIG. 4 shows one embodiment of an allocation optimization module and various associated sub-modules that may be used to implement various features and functions of the invention.

Referring to FIG. 4, while continuing to refer generally to FIG. 3, in certain embodiments, an optimization module 400 may be implemented that optimizes the allocation of extents 308 to data sets 302. This optimization module 400 may be implemented in hardware, software, firmware, or combinations thereof. In certain embodiments, the optimization module 400 is implemented within a storage system 110 such as that discussed in association in FIG. 2. In general, the optimization module 400 may select appropriately size extents 308 for data sets 302 based on which extents 308 would provide the greatest efficiency and/or performance. In certain cases, the optimization module 400 allocates a combination of smaller and larger extents 308 with certain data sets 302 where it would improve efficiency and/or performance.

In order to provide various features and functions of the invention, the optimization module 400 may include various sub-modules. These sub-modules may include one or more of a data set analysis module 402, initial allocation module 404, class selection module 406, override module 408, migration detection module 410, consolidation module 412, and class modification module 414. The sub-modules are presented by way of example and are not intended to represent an exhaustive list of sub-modules that may be included in or associated with the optimization module 400. The optimization module 400 may include more or fewer sub-modules than those illustrated, or the functionality of the sub-modules may be organized differently.

Prior to allocating a data set 302, a data set analysis module 402 may analyze desired characteristics of the data set 302 to determine which extents 308 should ideally be allocated to the data set 302 and where the data set 302 should ideally be located (e.g., what type of storage media 204 the data set 302 should be located on, what storage tier the data set 302 should be located on, what storage group or volume the data set 302 should be located in etc.). Characteristics that may be taken into account may include the size of the data set 302, the access method used to access data in the data set 302, and the like. Once these characteristics are analyzed, the initial allocation module 404 may generate the data set 302 at an appropriate location with an appropriate number extents 308 of the smaller and/or larger size.

The class selection module 406 may be configured to automatically assign the data set 302 to a particular storage class. This, in turn, will assign the data set 302 to a particular volume or group of volumes (i.e., storage group) that are configured to use extents 308 of a particular size. For example, assigning the data set 302 to a larger extent storage class 420 may cause the data set 302 to be allocated larger extents 308a. Similarly, assigning the data set 302 to a smaller extent storage class 422 may cause the data set 302 to be allocated smaller extents 308b. Similarly, assigning the data set 302 to a mixed-mode storage class 424 may cause the data set 302 to be allocated a combination of smaller and larger extents 308a, 308b. The override module 408 may enable a user to override a class selected by the class selection module 406 and select another class for a data set 302.

In certain embodiments, assigning a data set 302 to the mixed-mode storage class 424 will cause an initial portion of the data set 302 to be allocated the larger extents 308a, and an ending portion of the data set 302 to be allocated the smaller extents 308b. For example, if the data set 302 is a large sequentially-accessed data set 302, the initial portion of the data set 302 may be allocated the larger extents 308a. This is because when the sequentially-accessed data set 302 is read, unless there is a stored pointer to an intermediate location within the data set 302, the read will normally start from the beginning of the data set 302 and progress through the data set 302 until desired data is located. By contrast, when data is written to the sequentially-accessed data set 302, the write will occur to the end of the data set 302. By allocating smaller extents 308b to the end of the data set 302, newly written data may be kept in smaller chunks in faster storage media 204 (e.g. solid state drives) and moved to slower storage media 204 (e.g., hard disk drives) as the data cools.

Smaller sequential data sets 302, such as sequential data sets 302 under one hundred and five cylinders, may in certain embodiments be assigned to the smaller extent storage class 422. This will cause the data sets 302 to be allocated the smaller extents 308b. That way, if the data sets 302 are active, with reads or writes, the active portions of the data sets 302 are more likely to remain in higher performing storage tiers. For direct access data sets 302, such as key-sequenced data sets 302 (i.e., KSDSs), where one or a few areas of the data sets 302 are hot, these types of data sets 302 may also be assigned the smaller extent storage class 422.

The migration detection module 410 may detect when a data set 302 is migrated between different types of storage media 204, different volumes 300, or between different storage tiers. When such migration is detected, the consolidation module 412 may attempt to consolidate smaller extents 308b into larger extents 308a. For example, if certain smaller extents 308b are migrated from solid state drives 204 to slower hard disk drives 204, the consolidation module 412 may attempt to consolidate the smaller extents 308b into larger extents 308a either before, during, or after the migration. Since a large amount of I/O typically occurs to data sets 302 during these types of migrations, it is often more efficient to have the data set 302 allocated with the larger extents 308a during this period.

The class modification module 414 may be used to modify a storage class associated with a particular data set 302. For example, if a data set 302 is assigned to the smaller extent storage class 422 but the data set 302 would perform more efficiently with larger extents 308a, the data set 302 may be reassigned to the larger extent storage class 420. This class reassignment may in certain embodiments cause all of the smaller extents 308b associated with the data set 302 to be consolidated into larger extents 308a. Alternatively, existing extents 308 may stay the same and all new extents 308 allocated to the data set 302 may be the larger extents 308a.

Figure 5:
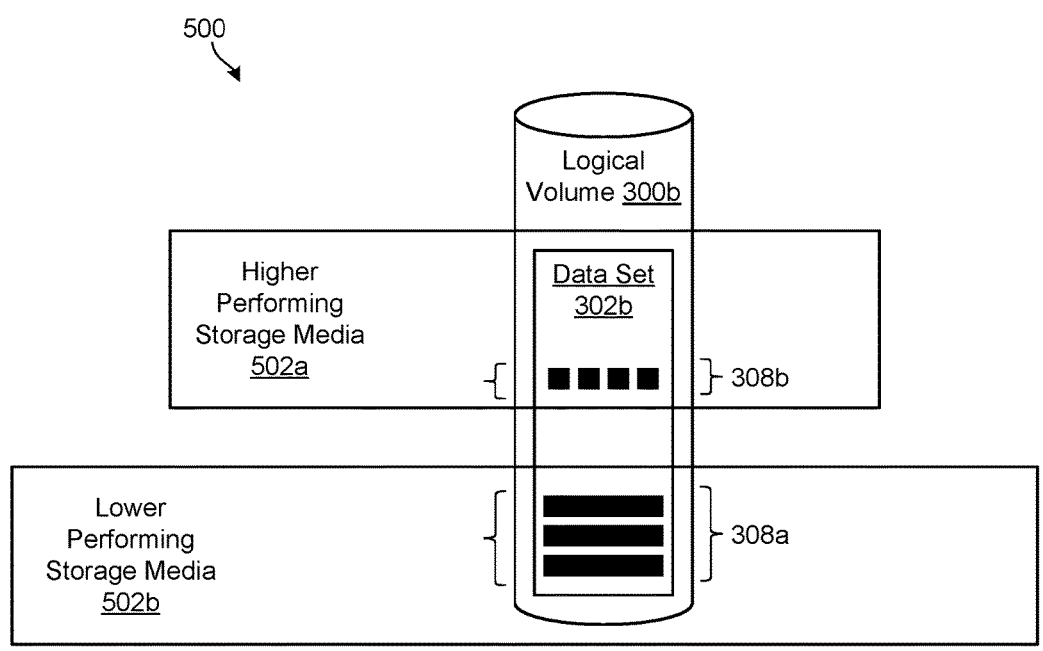
FIG. 5 shows one example of a data set that may utilize a combination of larger and smaller extents, and how this enables the data set to be distributed across multiple types of storage media in a tiered storage system.

Referring to FIG. 5, as previously mentioned, in certain embodiments, using a combination of smaller and larger extents 308a, 308b may provide the greatest efficiency and performance with certain types of data sets 302b. FIG. 5 shows an example of a data set 302 that has shorter and larger extents 308a, 308b on different tiers of a tiered storage system 500. For example, if a data set 302 is a large sequentially-accessed data set 302, an initial portion of the data set 302b may be allocated the larger extents 308a, as shown in FIG. 5. This is because reads to the data set 302 will generally require starting from a beginning of the data set 302 and progressing through the data set 302 until desired data is found. Writes, by contrast, will occur to the end of the sequentially-accessed data set 302. By allocating smaller extents 308b to the end of the data set 302, newly written data (which may be considered "hot" data) may be kept in smaller chunks in higher performing storage media 502a and moved to lower performing storage media 502b as the data cools.

Figure 6:
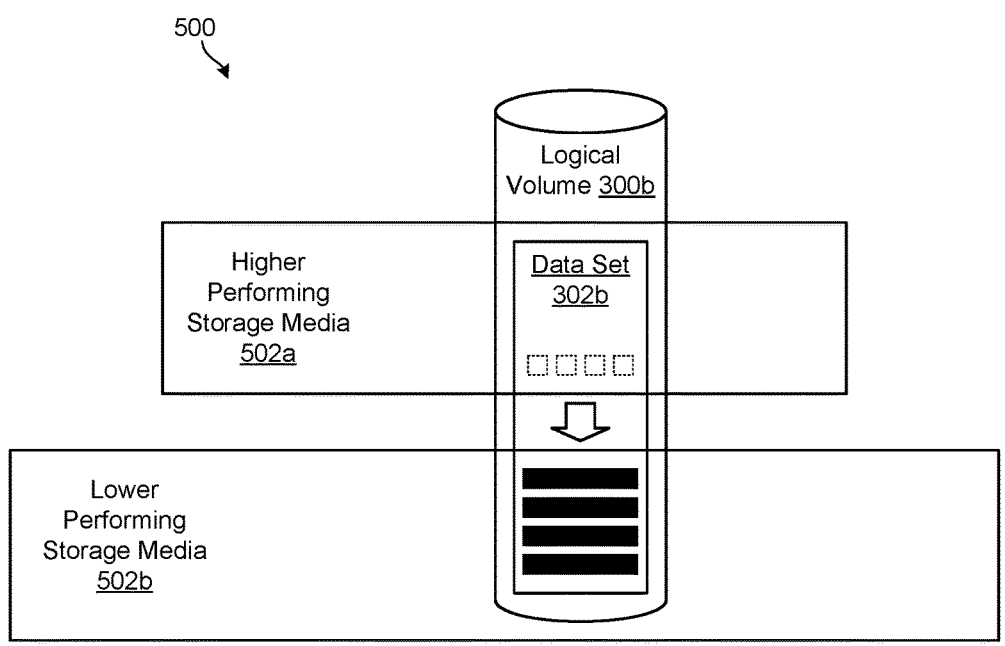
FIG. 6 shows how smaller extents of the data set of FIG. 5 may be consolidated into larger extents when the extents are migrated from one storage tier to another, in this example from higher-performing storage media to lower-performing storage media.

Referring to FIG. 6, in certain embodiments, when moving smaller extents 308b from higher performing storage media 502a to lower performing storage media 502b, the smaller extents 308b may be consolidated into larger extents 308a. As previously mentioned, since a significant amount of I/O may occur to a data set 302 while it is being migrated, it is often more efficient to have the data set 302 allocated with the larger extents 308a during the migration process. Migration of data provides a good opportunity to consolidate (or possibly de-consolidate larger extents 308a into smaller extents 308b) since data is already being manipulated and moved from one location to another.

Figure 7:
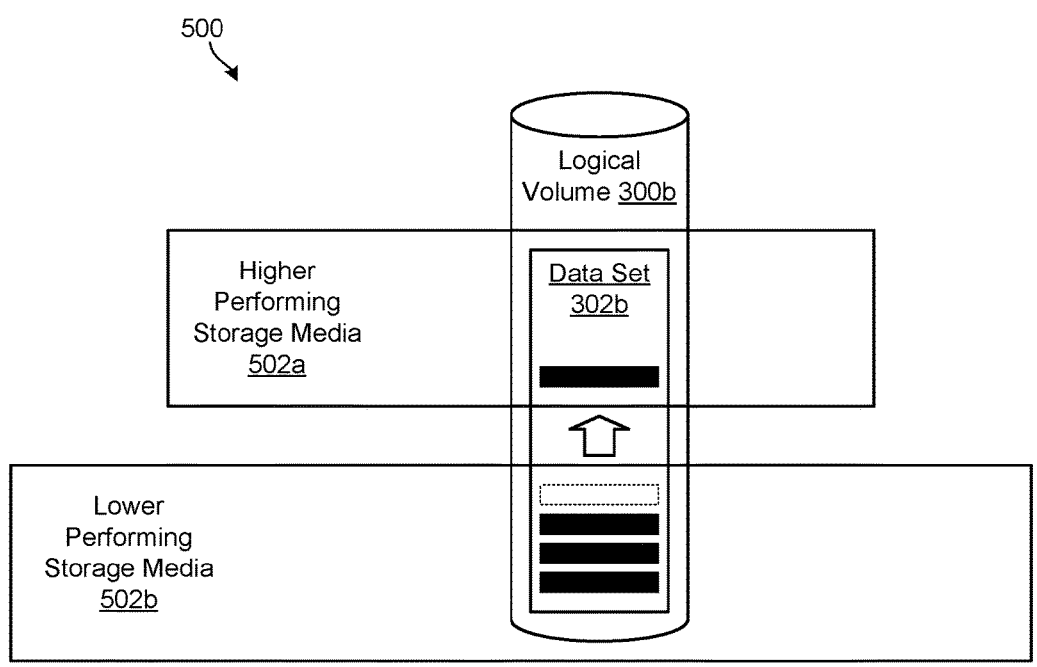
FIG. 7 shows larger extents of the data set of FIG. 5 being migrated from lower-performing storage media to higher-performing storage media.
Figure 8:
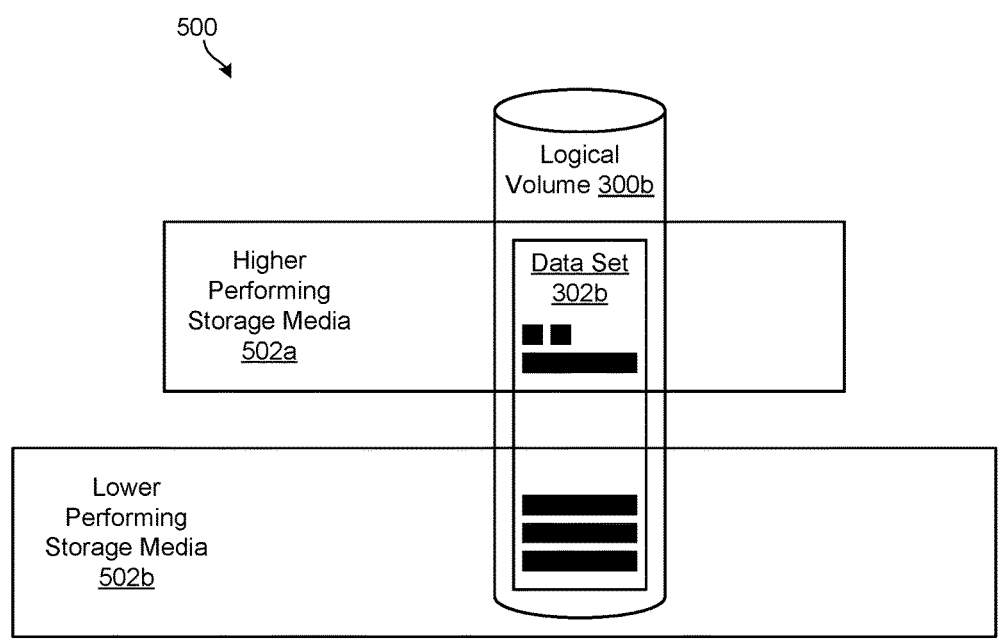
FIG. 8 shows how the data set of FIG. 5 may be extended on higher-performing storage media using smaller extents.

Referring to FIGS. 7 and 8, in certain embodiments, when data is recalled from lower performing storage media 502b to higher performing storage media 502a, extents 308 that were previously consolidated into the larger size may remain in the larger format, a as shown in FIG. 7. Alternatively (not shown), larger extents 308a could be broken down into smaller extents 308b when moved from lower performing storage media 502b to higher performing storage media 502a. In certain embodiments, even in cases where extents 308 migrated from the lower performing storage media 502b to the higher performing storage media 502a remain in the larger size, newly created extents 308 on the higher performing storage media 502a (created as a result of writes, for example) may be of the smaller size.

The scenarios shown in FIGS. 5 though 8 are simply provided by way of example and not limitation. Other behaviors are possible and within the scope of the invention.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method for optimizing the allocation of extents to data sets, the method comprising:
    providing a plurality of storage classes, the storage classes comprising a first storage class configured to allocate larger extents to data sets, a second storage class configured to allocate smaller extent to data sets, and a mixed-mode storage class configured to allocate a combination of the smaller extents and the larger extents to data sets;
    enabling a sequentially-accessed data set to be assigned to the mixed-mode storage class;
    upon assigning the sequentially-accessed data set to the mixed-mode storage class, allocating the larger extents to an initial portion of the sequentially-accessed data set, and the smaller extents to an ending portion of the sequentially-accessed data set; and
    upon writing data to an end of the sequentially-accessed data set, writing the data to the smaller extents.

2. The method of claim 1, further comprising assigning a data set to the first storage class in the event I/O activity to the data set occurs to specific areas of the data set.

3. The method of claim 1, further comprising assigning a data set to the second storage class in the event I/O activity to the data set is substantially evenly distributed.

4. The method of claim 1, wherein the larger extents of the sequentially-accessed data set are maintained on slower storage media and the smaller extents of the sequentially-accessed data set are maintained on faster storage media.

5. The method of claim 1, further comprising selecting a storage class for a data set based on a size of the data set.

6. The method of claim 1, further comprising selecting a storage class for a data set based on an access method used to access data in the data set.

7. The method of claim 1, further comprising selecting a storage class for a data set based on a location of the data set in a tiered storage system.

8. A computer program product for optimizing the allocation of extents to data sets, the computer program product comprising a computer-readable storage medium having computer-usable program code embodied therein, the computer-usable program code configured to perform the following when executed by at least one processor:
    provide a plurality of storage classes, the storage classes comprising a first storage class configured to allocate larger extents to data sets, a second storage class configured to allocate smaller extent to data sets, and a mixed-mode storage class configured to allocate a combination of the smaller extents and the larger extents to data sets;
    enable a sequentially-accessed data set to be assigned to the mixed-mode storage class;
    upon assigning the sequentially-accessed data set to the mixed-mode storage class, allocate the larger extents to an initial portion of the sequentially-accessed data set, and the smaller extents to an ending portion of the sequentially-accessed data set; and
    upon writing data to an end of the sequentially-accessed data set, write the data to the smaller extents.

9. The computer program product of claim 8, wherein the computer-usable program code is further configured to assign a data set to the first storage class in the event I/O activity to the data set occurs to specific areas of the data set.

10. The computer program product of claim 8, wherein the computer-usable program code is further configured to assign a data set to the second storage class in the event I/O activity to the data set is substantially evenly distributed.

11. The computer program product of claim 8, wherein the larger extents of the sequentially-accessed data set are maintained on slower storage media and the smaller extents of the sequentially-accessed data set are maintained on faster storage media.

12. The computer program product of claim 8, wherein the computer-usable program code is further configured to select a storage class for a data set based on a size of the data set.

13. The computer program product of claim 8, wherein the computer-usable program code is further configured to select a storage class for a data set based on an access method used to access data in the data set.

14. The computer program product of claim 8, wherein the computer-usable program code is further configured to select a storage class for a data set based on a location of the data set in a tiered storage system.

15. A system for optimizing the allocation of extents to data sets, the system comprising:
    at least one processor;
    at least one memory device operably coupled to the at least one processor and storing instructions for execution on the at least one processor, the instructions causing the at least one processor to:
    provide a plurality of storage classes, the storage classes comprising a first storage class configured to allocate larger extents to data sets, a second storage class configured to allocate smaller extent to data sets, and a mixed-mode storage class configured to allocate a combination of the smaller extents and the larger extents to data sets;
    enable a sequentially-accessed data set to be assigned to the mixed-mode storage class;
    upon assigning the sequentially-accessed data set to the mixed-mode storage class, allocate the larger extents to an initial portion of the sequentially-accessed data set, and the smaller extents to an ending portion of the sequentially-accessed data set; and
    upon writing data to an end of the sequentially-accessed data set, write the data to the smaller extents.

16. The system of claim 15, wherein the instructions further cause the at least one processor to assign a data set to the first storage class in the event I/O activity to the data set occurs to specific areas of the data set.

17. The system of claim 15, wherein the instructions further cause the at least one processor to assign a data set to the second storage class in the event I/O activity to the data set is substantially evenly distributed.

18. The system of claim 15, wherein the larger extents of the sequentially-accessed data set are maintained on slower storage media and the smaller extents of the sequentially-accessed data set are maintained on faster storage media.

19. The system of claim 15, wherein the instructions further cause the at least one processor to select a storage class for a data set based on a size of the data set.

20. The system of claim 15, wherein the instructions further cause the at least one processor to select a storage class for a data set based on an access method used to access data in the data set.

* * * * *